Figure 1:
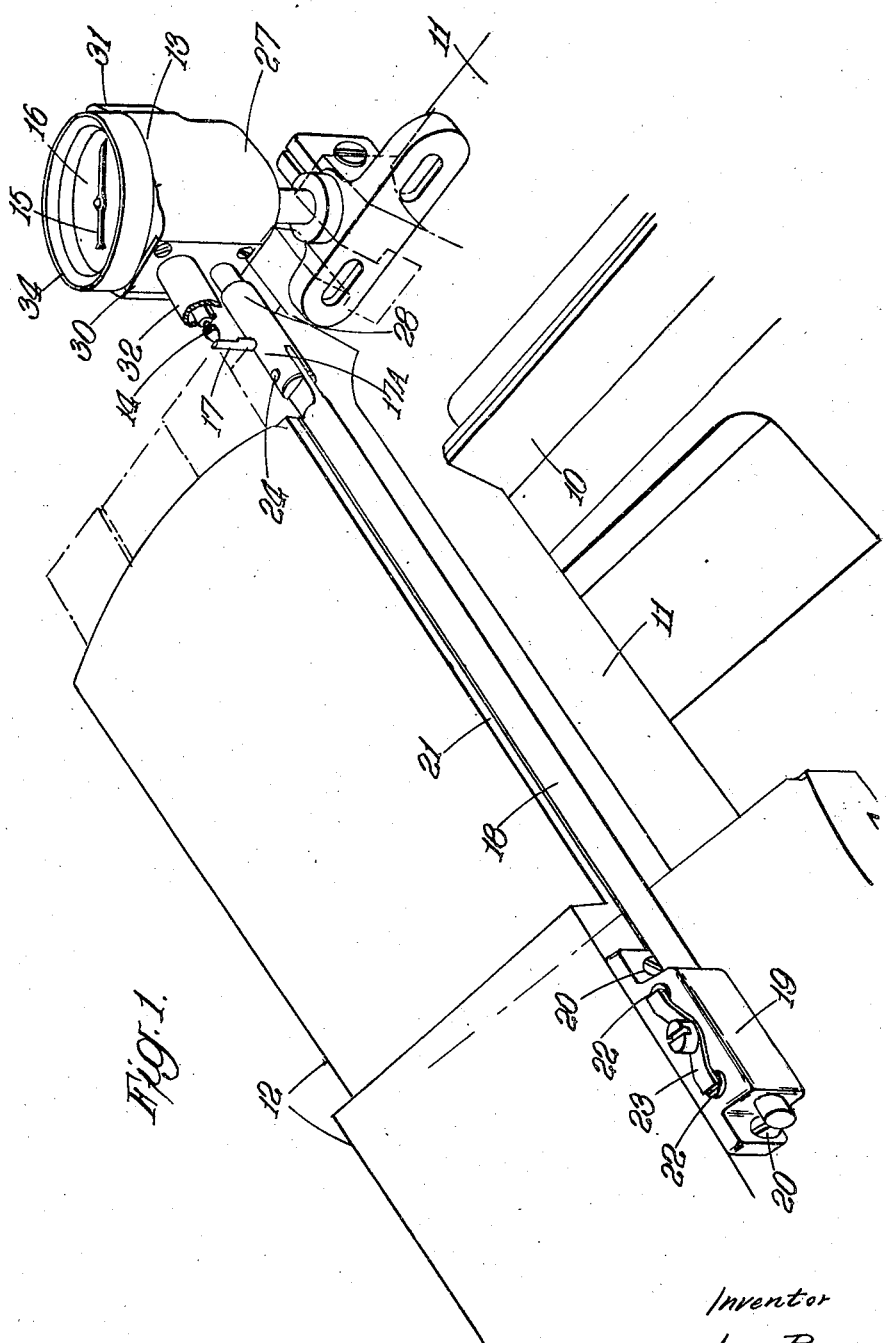

Sept. 3, 1946.  I. BENKOE  2,406,793
DEVICE FOR MEASURING CHANGES OF DISTANCE
BETWEEN TWO RELATIVELY MOVABLE PARTS
Filed April 9, 1943  2 Sheets-Sheet 1

Inventor
Ivan Benkoe
by Malcolm W. Fraser
attorney

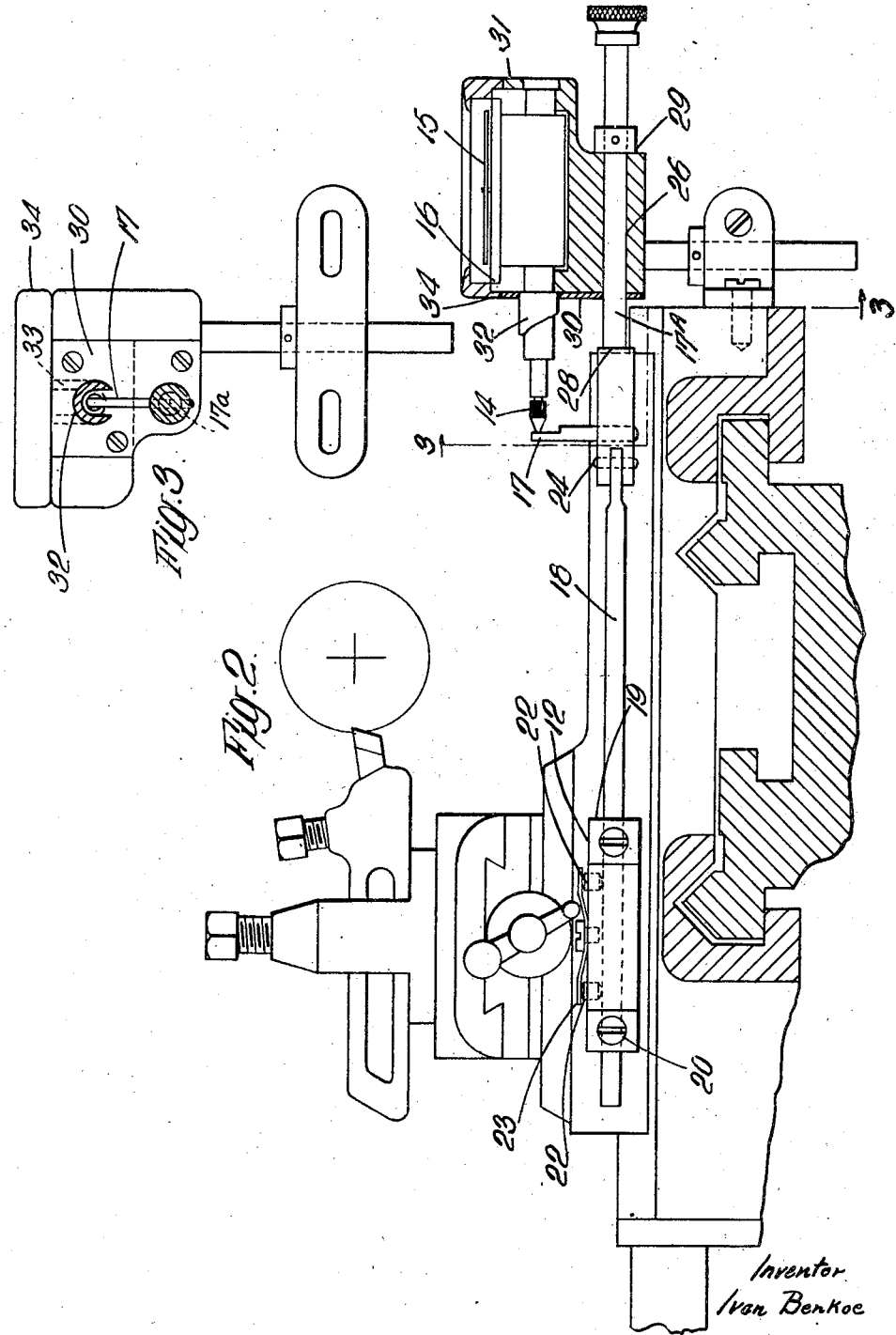

UNITED STATES PATENT OFFICE 2,406,793

DEVICE FOR MEASURING CHANGES OF DISTANCE BETWEEN TWO RELATIVELY MOVABLE PARTS

Ivan Benkoe, London N. W. 3, England, assignor to Erwin Benkoe, Bronx, N. Y.

Application April 9, 1943, Serial No. 482,490
In Great Britain April 15, 1942

4 Claims. (Cl. 33—125)

The present invention relates to a device for measuring changes of distance between two relatively movable parts.

The device is particularly suitable for use in conjunction with a lathe for measuring changes of diameter of the workpiece being turned, but may also be used as an accessory with any machine during the use of which it is desired to measure the distance apart of two relatively movable parts. The indication of distance change given by the device is a continuous one and may, therefore, be observed at any time whilst the two parts are in relative motion, for example, the change of diameter of a piece of work in a lathe may be continuously observed.

Gauges for measuring changes of distance are already known. One such gauge for this purpose comprises a longitudinally movable feeler-pin which is mechanically linked through suitable gearing with a pointer moving over a circular dial, a measure of changes of the longitudinal position of the feeler being directly indicated by the pointer on the dial as so many hundredths or thousandths of an inch.

Normally, however, the range of distance measurable by such gauges is limited; usually from zero to about an inch.

A known form of gauge, such as that above described, may if desired be used in carrying out the present invention, although the basic idea underlying the invention is independent of the type of gauge used. But whatever the type of gauge employed, it is one object of the present invention to provide means whereby there may be measured changes of distance greater than the range covered by the gauge alone.

In accordance with the present invention there is provided a device for measuring changes of distance between two relatively movable parts, comprising a gauge of limited range, mounted upon one of said parts and a stop mounted upon the other part, the gauge and stop being in contact and one of them being adjustable in position on its part so that the range of distance measurable by the device as a whole is greater than that measurable by the gauge alone. Preferably the stop is adjustable on its part, being in the form of a rod frictionally mounted within a block secured to one part so as to be slidable in the block.

The invention will now be described with reference to the accompanying drawings which are illustrations of a preferred form of the device as applied to a lathe for measuring changes of diameter of work being turned on the lathe and in which, Figure 1 is a perspective view of a preferred form of the invention, Figure 2 is an elevation partly in section of the gauging device shown in Figure 1, whilst Figure 3 is a view taken in the direction of the arrows 3—3 of Figure 2.

In the figures the lathe bed is shown at 10, the cross slide base at 11, and the cross-slide is shown at 12. It will be appreciated that changes of diameter of work being turned in the lathe can be measured by measuring the relative motion between the cross-slide 12, and its base 11, the change of diameter actually being equal to twice this relative motion.

The required changes of distance are measured by means of a gauge 13 mounted fixedly on the base 11, which cooperates with a stop adjustably mounted on the slide 12 and which will be described presently in detail.

As illustrated by way of example the gauge is of well-known type and comprises a longitudinally movable feeler 14 coupled through suitable gears with a pointer 15 rotatable over a dial 16 bearing a scale reading in hundredths, thousandths or ten-thousandths of an inch. All movements of the feeler are thus accurately indicated by the pointer moving over its scale.

Movement of the cross-slide 12, relative to the gauge 13 (or to the slidebase 11 on which the gauge is mounted) is indicated on the gauge as a result of the pressure against the feeler 14 of an upstanding pin 17 rigidly mounted in a link 17A pivoted on a rod 18 which is frictionally mounted, so as to be slidable therein, in a block 19 fixedly secured, as by screws 20, to the cross-slide 12.

The function of the upstanding pin 17 is to avoid the necessity of mounting the rod 18 in the same horizontal plane as the feeler 14. Actually, as can be seen from Figure 1, the rod 18 is sunk in a groove 21, with which the cross-slide bases of most existing lathes are formed.

It will be appreciated, therefore, that if the present device is to be added to an existing lathe the rod 18 does not interfere in any way with the operation of the lathe.

The rear end of the rod 18 is slidably mounted within the block 19 but is normally prevented from moving with respect to the block by the engagement, with the rod 18, of two plungers 22 located in bores in the block 19 and pressed upon the rod 18 by a leaf-spring 23 secured to the block 19.

During normal operation of the device the friction between the plungers 22 and the rod 18 is sufficient to prevent the rod 18 moving within the block 19. Consequently, as the cross-slide 12 is moved towards the gauge 13, during the operation of turning work held in the lathe, the upstanding pin 17 moves against the feeler 14 so that the distance by which the cross-slide approaches the gauge is indicated by the pointer 15 moving over the dial 16.

The rod 18 is preferably, and as illustrated, pivotally connected with the link 17A about a pivot 24 in order to avoid the necessity of mounting the block 19 accurately in line with the feeler 14. This mechanical device also ensures that strains and vibrations of the cross-slide 12 are not transferred to the sensitive mechanism of the gauge 13.

The link 17A is slidable within a bore 26 formed in the base 27 of the gauge 13 and on either side of the gauge 13 the link 17A is provided with two bosses 28 and 29.

The base 27 of the gauge is secured to the cross-slide base 11 in any convenient manner. It is provided with two end plates 30 and 31 which are removed when the gauge is to be dropped into the base, the feeler cover 32 then resting in a slot 33 formed in the base.

The dial of the gauge is provided with a cover 34 which protects it and by the rotation of which the dial can be moved into any desired angular position.

The device is used as follows: let it be assumed that the device is to be used in order to measure a change of distance between two alternative movable parts greater than can be measured by the dial gauge alone; for example, let it be supposed that the maximum range of the dial is 1 inch whilst the distance to be measured is 1½ inches. A first cut is taken off the work being turned in the lathe. The boss 29 is then pushed to the left as far as it will go, the rod 18 meanwhile sliding through its friction block 19. The cover 34 is then rotated to bring the reading to zero. The work is then turned down until the gauge approaches the end of its range, i. e., when the feeler 14 has nearly completed its maximum possible travel. A note is made of the reduction in diameter which has been effected, the boss 29 is again pushed to the left as far as it will go, by means of the button shown, and work is recommenced until the desired change in diameter has been achieved.

The position of the boss 28 is such that if, inadvertently, turning is not stopped before the gauge comes to the end of its range damage cannot be done to the instrument. The boss 28 bears against the gauge base 27 when the feeler 14 is pushed in by its maximum travel; if, therefore, turning is continued beyond this point the rod 18 is prevented from moving further to the right and hence it slides through its friction block 19.

The bosses 28 and 29 function in the reverse sense when turning is being carried out internally and the cross-slide and its base are being moved apart.

It will be seen that the device is capable of measuring over a range greater than that given by the gauge alone, by virtue of the adjustment of the rod 18 with respect to the cross-slide 12. An adjustment may be repeated as often as may be necessary so that the range covered by the device as a whole is limited only by the length of the rod 18.

It will be clear that the rod 18 may be fixed on the cross-slide whilst the gauge is made adjustable on the cross-slide base.

What is claimed is:

1. A device for measuring changes of distance between a lathe cross-slide and its base comprising a feeler-gauge fixedly mounted upon said cross-slide base, a friction-block mounted upon the cross-slide and a rod slidable within said friction block, but normally frictionally held therein, the end of said rod remote from the friction-block being in contact with the feeler of said gauge.

2. A device for measuring changes of distance between two relatively movable parts, comprising a gauge of limited range mounted upon one of said parts and a stop mounted on the other part, said stop comprising a rod, frictionally mounted so as to be slidable within a block which is secured to one of said parts, and said rod being provided, at its end adjacent the gauge, with an upstanding pin or the like which makes contact with an actuating member of the gauge.

3. A device for measuring changes of distance between two relatively movable parts, comprising a gauge of limited range mounted upon one of said parts and a stop mounted on the other part, said stop comprising a rod frictionally mounted so as to be slidable within a block which is secured to one of said parts, said rod being formed, intermediate its length with a hinged joint pivoting about a substantially vertical axis.

4. A device for measuring changes of distance between two relatively movable parts, comprising a gauge of limited range mounted upon one of said parts and a stop mounted upon the other part, said stop comprising a rod, frictionally mounted so as to be slidable within a block which is secured to one of said parts, collars being provided on said rod which cooperate with a fixed member to limit the normal travel of the rod to the range of distance measurable by the gauge.

IVAN BENKOE.